G. W. CLOUGH,

Assignor, by mesne assignments, to himself and J. D. CLOUGH.

Vapor Burner.

No. 9,602. Reissued March 8, 1881.

Witnesses
George Edwards
Edward Edwards

Inventor
Geo. W. Clough
Per Wm. R. Singleton
Atty

N. PETERS, PHOTO-LITHOGRAPHER, WASHINGTON, D. C.

UNITED STATES PATENT OFFICE.

GEORGE W. CLOUGH, OF CLEVELAND, OHIO, ASSIGNOR, BY MESNE ASSIGNMENTS, TO HIMSELF AND JAMES D. CLOUGH.

VAPOR-BURNER.

SPECIFICATION forming part of Reissued Letters Patent No. 9,602, dated March 8, 1881.

Original No. 188,283, dated March 13, 1877. Application for reissue filed September 16, 1880.

*To all whom it may concern:*

Be it known that I, GEORGE W. CLOUGH, of Cleveland, in the county of Cuyahoga, and State of Ohio, have invented new and useful Improvements in Vapor-Burners, of which the following is a description, to enable others to make and use the same, reference being had to the accompanying drawings, making a part of this specification.

The invention consists in such parts and combinations as will hereinafter be more fully set forth and claimed.

Figure 1:
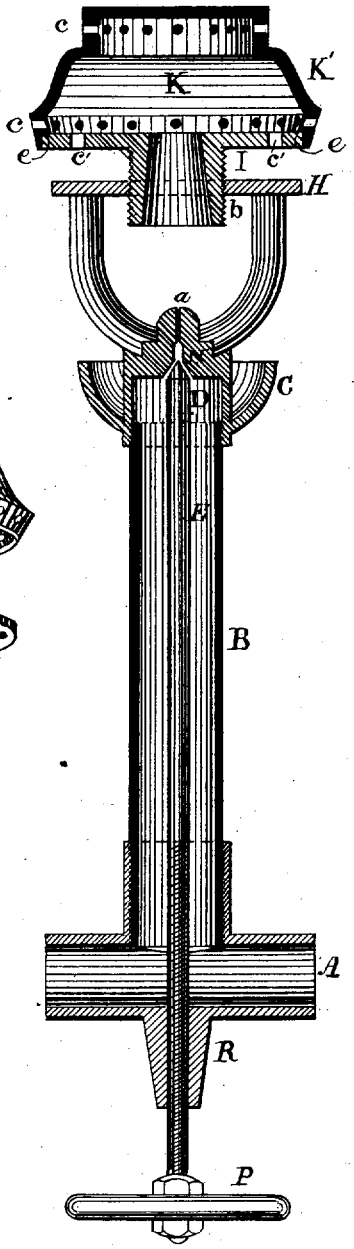
Figure 2:
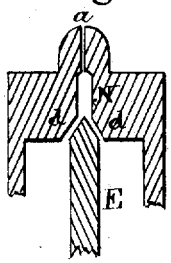
Figure 4:
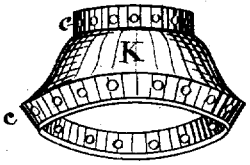
Figure 3:
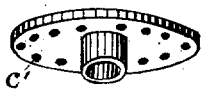

In the drawings, Figure 1 represents a sectional view of a vapor-burner embodying my invention. Fig. 2 is an enlarged view of that part of the burner embracing the expansion-chamber. Fig. 3 is a detached view of the adjusting-plate. Fig. 4 is a similar view of the perforated combustion cap or dome.

Like letters of reference refer to like parts in the several views presented.

A is a pipe which leads from and is connected with an elevated reservoir, (not shown in the drawings,) whence the gasoline or hydrocarbon fluid comes for burning in the ordinary well-known manner. Connected with said pipe A is the vertical tube B, the upper part of which forms the vaporizing-chamber D. Around said part of the tube is situated the primary heating-cup C. Above the vaporizing-chamber is placed the expansion-chamber N, from which leads the passage or outlet *a*. The sides of said chamber are beveled or funneled at their lower end, as shown at *d*, and the angle of said bevel is made to correspond with that of the tapering part of the screw-pin valve E, so as to secure a very tight and close fit to prevent leakage. The lower part of the rod of the valve E is screw-threaded, which works in the female screw in the projection R. Said rod is provided with a hand-wheel, P, or other suitable device, by which the supply of the vaporized fluid is regulated. As it is turned in either direction the tapering or pin-pointed valve E is lowered or elevated, and thereby an annular space at *d* is formed, thus permitting or cutting off the flow of the fluid.

H is the top plate, provided with a central opening. It is supported on the arms G G, which rise from the sides of the tube B at the top thereof, and serves to establish a free open space between the mouth of the outlet *a* and the burner for the purpose of securing combustion.

I is the adjusting-plate, provided with a downwardly-projecting guide-pipe, *b*, screw-threaded on the outside, whereby, in connection with the screw-threaded opening of the top plate, the said adjusting-plate I can be elevated or lowered relatively to said top plate. The guide-pipe *b* is situated directly over the outlet *a*, from whence the vaporized fluid passes through said guide-pipe into the perforated combustion-cap K. Said adjusting-plate is also provided with a circle of openings or jet-apertures, *c'*. The object in making the plate I adjustable is to secure a blue or heating flame. This desired result can be reached in all instances with my improvement by a simple adjustment upward or downward of the plate I, as circumstances may determine.

K is the perforated cap of the combustion-chamber K'. It fits to the periphery or sides of plate I loosely, so that it can be taken off or removed, when desired, by means of a shoulder and flange on the lower edge of the cap, as seen in Fig. 1 at *e e*. One advantage thereby secured is that in case the opening or outlet *a* becomes clogged or stopped up the instrument by which to clear it can be passed through the tube *b* from above in a line with the axis of outlet *a*, thus diminishing the liability of injury to the outlet, as well as facilitating its cleaning.

The combustion-chamber K' is formed by the interior of the cap K, and the floor or base thereof by the plate I. The upper section or cap is made without a floor or bottom, and rests upon the plate I, to which it is removably connected, and the two sections or parts forming the chamber are held in place by a circular flange at the junction of the said sections, which holds and prevents lateral displacement of the sections.

By means of the expansion-chamber N a very steady and even flow of the vaporized fluid through the outlet *a* is secured, and any of the fluid which escapes vaporization in the chamber D and enters the expansion-chamber N is vaporized therein, so that by this improvement a thorough vaporizing of the gasoline or hydrocarbon fluid is secured.

The operation of the device is as follows: The gasoline or hydrocarbon fluid enters the tube B by hydrostatic pressure. To light the burner turn the wheel P so as to open the valve E. This will cause a jet of fluid to pass through the opening *a* into the combustion-chamber K′, striking against the roof or top thereof. The fluid will run down into the cup C, and when the same is about half full close the valve E to stop the flow. Then light the fluid in the cup and let it burn out. This operation heats the upper part of tube B sufficiently to cause vaporization of the fluid to take place in chamber D thereof. Now, when the valve is opened again, the vaporized fluid passes into the combustion-cap and issues at the jet-openings *c c c′*, where, when lighted, it burns with a blue flame, which can be regulated as desired by opening the valve more or less. The vaporized fluid that passes from the interior of the cap K through the jet apertures *c′* issues between the top plate, H, and adjusting-plate I, and burns with a blue flame, which forms a continuous sheet around the burner. The heat from the top plate, H, and from the burner is transmitted by the arms G and by radiation to the upper part of the tube B to a sufficient extent to continue the vaporization of the gasoline in the chamber D, which was secured in the first instance by the direct application of heat by means of the cup C.

Any number of these burners may be connected with and supplied by the same reservoir, limited, of course, only to the capacity of the latter.

The interior of the guide-pipe *b* is preferably made tapering, with the smaller end opening into the combustion-cap K.

A removable perforated cap of sheet metal has heretofore been used on an illuminating-burner with a curved base-plate, but such cap fitted the base-plate so closely as to be practically immovable.

My burner is so adjusted on the flange or base-plate that it can readily be removed when either hot or cold. It is made of cast metal, and by making it of the form shown the use of a core in casting is avoided, as has been done in the manufacture of other articles, thereby facilitating and cheapening manufacture. This method of casting has this particular advantage in this case, that it secures a smoother interior surface, which has important relations to the perfection of the gas-burning perforations, and to the matter of the deposit of soot, as will be readily understood.

What I claim as my invention, and desire to secure by Letters Patent, is—

1. The removable perforated cap K, fitted on the base-plate, and in combination with said plate and with the guide-pipe and jet-orifice, substantially as and for the purpose described.

2. In combination with the vaporizing-chamber D, expansion-chamber N, and screw-valve E, the adjusting-plate I, guide-pipe *b*, and removable cap K, substantially as and for the purpose described.

3. The combination, with the vaporizing-chamber D, expansion-chamber N, and screw-valve E, of the adjusting-plate I, guide-pipe *b*, top plate, H, and removable cap K, substantially as described.

4. The combination, with the vaporizing-chamber D, expansion-chamber N, screw-valve E, and primary heating-cup C, of the adjusting-plate I, guide-pipe *b*, top plate, H, and removable combustion-cap K, substantially as described.

5. The combination, with the vaporizing-chamber D, expansion-chamber N, screw-valve E, and primary heating-cup C, of the arms G G, adjusting-plate I, guide-pipe *b*, top plate, H, and removable cap K, substantially as described.

6. A perforated cap, K, adjustable to a bottom or base plate, I, constructed as described, the two forming a combustion-chamber, substantially as and for the purpose described.

7. The combination of the removable perforated combustion-cap K with a base-plate, I, and guide-pipe *b*, having a central opening arranged in relation to the gas-valve orifice, substantially as and for the purpose described.

GEORGE W. CLOUGH.

Witnesses:
J. H. BURRIDGE,
GEO. BERGERON.